United States Patent
Rodriguez et al.

(10) Patent No.: US 10,676,572 B1
(45) Date of Patent: Jun. 9, 2020

(54) WATER-DECOMPOSABLE THERMOSET RESIN FORMULATIONS, AND WATER-DECOMPOSABLE THERMOSET POLYMERS MADE THEREFROM

(71) Applicant: HRL Laboratories, LLC, Malibu, CA (US)

(72) Inventors: April R. Rodriguez, Santa Monica, CA (US); Zak C. Eckel, Thousand Oaks, CA (US); Phuong P. P. Bui, Thousand Oaks, CA (US); Ashley M. Dustin, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/195,854

(22) Filed: Nov. 20, 2018

Related U.S. Application Data

(60) Provisional application No. 62/634,392, filed on Feb. 23, 2018.

(51) Int. Cl.
| | |
|---|---|
| *C08F 2/46* | (2006.01) |
| *C08F 2/50* | (2006.01) |
| *C08G 61/04* | (2006.01) |
| *C08G 75/045* | (2016.01) |
| *C09D 5/00* | (2006.01) |
| *C09D 181/02* | (2006.01) |
| *C09D 11/102* | (2014.01) |
| *C09D 11/101* | (2014.01) |
| *B33Y 70/00* | (2020.01) |
| *B33Y 40/00* | (2020.01) |
| *B29K 83/00* | (2006.01) |
| *B29C 64/40* | (2017.01) |
| *B29C 64/112* | (2017.01) |
| *B29C 64/124* | (2017.01) |
| *B33Y 10/00* | (2015.01) |

(52) U.S. Cl.
CPC ............ *C08G 75/045* (2013.01); *B33Y 40/00* (2014.12); *B33Y 70/00* (2014.12); *C09D 5/008* (2013.01); *C09D 11/101* (2013.01); *C09D 11/102* (2013.01); *C09D 181/02* (2013.01); *B29C 64/112* (2017.08); *B29C 64/124* (2017.08); *B29C 64/40* (2017.08); *B29K 2083/00* (2013.01); *B29K 2995/0062* (2013.01); *B33Y 10/00* (2014.12); *C08G 2150/00* (2013.01)

(58) Field of Classification Search
CPC ............... C08F 2/48; C08F 2/50; C08G 61/04
USPC .................. 522/64, 71, 1, 189, 184, 6; 520/1
See application file for complete search history.

(56) References Cited

U.S. PATENT DOCUMENTS

| | | | |
|---|---|---|---|
| 2017/0204227 A1* | 7/2017 | Eckel | B33Y 10/00 |
| 2018/0148585 A1* | 5/2018 | Eckel | B33Y 70/00 |
| 2019/0002353 A1* | 1/2019 | Eckel | C04B 35/589 |

OTHER PUBLICATIONS

Mulazim et al, Preparation and Characterization of UV-Curable Boron containing, Transparent Hybrid Coatings, Dec. 9, 2010, Journal of Applied Polymer Science, vol. 120, 2112-2121 (Year: 2010).*

Li et al, Structure and improved thermal stability of phenolic resin containing silicon and boron elements, Jul. 26, 2016, Polymer Degradation and Stability, 133, 321-329 (Year: 2016).*

* cited by examiner

*Primary Examiner* — Jessica Whiteley
(74) *Attorney, Agent, or Firm* — O'Connor & Company

(57) ABSTRACT

Some variations provide a curable resin formulation for a water-decomposable thermoset material, comprising: first molecules containing a boron-oxygen-silicon group and a first functional group that is reactive for free-radical, cationic, and/or hydrosilylation polymerization; optionally second molecules containing at least one second functional group that is reactive with the first molecules; and a polymerization initiator. Other variations provide a curable resin formulation comprising: first molecules containing a polyester group and a first functional group that is reactive for free-radical, cationic, and/or hydrosilylation polymerization; optionally second molecules containing at least one second functional group that is reactive with the first molecules; and a polymerization initiator. Other variations provide a cured, water-decomposable thermoset solid material comprising boron-oxygen-silicon groups and/or polyester groups, wherein the material is characterized by at least 50 wt % decomposition in water with a pH of 7, for 60 minutes, at a temperature of 100° C.

14 Claims, 3 Drawing Sheets

WATER-DECOMPOSABLE THERMOSET RESIN FORMULATIONS, AND WATER-DECOMPOSABLE THERMOSET POLYMERS MADE THEREFROM

PRIORITY DATA

This patent application is a non-provisional application with priority to U.S. Provisional Patent App. No. 62/634,392, filed Feb. 23, 2018, which is hereby incorporated by reference herein.

FIELD OF THE INVENTION

The present invention generally relates to water-decomposable thermoset resin formulations; polymers made from these resin formulations; objects coated with, or containing, such polymers; and methods of making and using the resin formulations and the polymers.

BACKGROUND OF THE INVENTION

Stereolithography is an additive manufacturing technology, commonly referred to as 3D printing, that converts liquid materials into solid parts, layer by layer, by selectively curing them using a light source. Stereolithography is widely used to create models, prototypes, patterns, and production parts for a range of industries from engineering and product design to manufacturing, dentistry, jewelry, model making, and education. In addition to stereolithography, 3D printing includes numerous processes, which vary in their method of layer manufacturing, material, and machine technology.

Sacrificial layers of polymers are currently used in stereolithography and micromachining. Sacrificial layers can be made up of acrylic or epoxy polymer resins that are transformed from liquid to solid after exposure to UV light. These sacrificial layers can be made of materials that differ chemically from the structural part being created, allowing selective removal.

In the case of stereolithography, support structures can be created from the same material as the structural part being formed. After the part is cured, the supports are normally removed mechanically, i.e. by cutting and sanding any remaining support, which can make post-processing long and tedious. There is a desire to be able to remove support structures chemically rather than mechanically.

3D-printed preceramic parts tend to be brittle in nature and the mechanical removal of the supports can lead to damage and defects of the part. There is a need to 3D-print preceramic parts with sacrificial structures that can easily be removed without the need to mechanically cut them. There are known formulations that can be used for UV-cured stereolithography, incorporating functional groups that are sensitive to hydrolysis under corrosive (extreme pH) conditions at elevated temperatures. These corrosive conditions may be damaging to the printed part of interest, especially if the part also contains functional groups that are sensitive to hydrolysis.

The introduction of ester functionality along the backbone of the polymer provides a path to hydrolysis—however, this requires etching under caustic conditions (e.g., a sodium hydroxide solution at pH 12). Other polymers that may be used as sacrificial layers in other applications are water-soluble thermoplastics such as polyvinylpyrrolidine (PVP), polyvinyl alcohol (PVOH), polyvinyl acetate (PVA), polyethylene glycol (PEG), and polyacrylic acid (PAA). However, it is difficult to use these polymers in stereolithography without the necessary chemical functionality for UV-based free-radical or cationic curing. For a solid, durable UV-cured support, it is important to have a high density of crosslinking. Even if the polymer backbone is water-soluble, it will usually only swell unless chemical bonds are actually cleaved.

There is a desire for polymers that are soluble in water, rather than organic solvents. Water solubility of a polymer can be enhanced by polymer hydrolysis. Examples of polymers that are susceptible to hydrolysis are polyesters, polyamides, polyurethanes, polycarbonates, polyethers, polyanhydrides, and polyureas, but these all require harsh hydrolytic conditions, making them undesirable.

Thermoplastics are often soluble in organic solvents such as alcohols, ketones, aromatics oils, and hydrocarbons. However, these thermoplastics are not printable in UV-cure-based 3D printing and can damage, craze, or swell traditionally printed polymer components. Some biodegradable polymers, such as those based on lactide, glycolide, and caprolactone, contain hydrolysable ester or carbonate linkages, but these biodegradable polymers are not printable in UV-cure-based 3D printing.

No known prior art provides formulations cured by UV-based free-radical polymerization, cationic polymerization, or hydrosilylation to form 1D, 2D, or 3D structures that can be rapidly hydrolyzed in water. There is a need to create sacrificial layers and structures that undergo rapid hydrolysis and removal, especially for stereolithography of 3D-printed parts, such as (but not limited to) preceramic parts.

Current materials used as sacrificial layers require strongly acidic or basic conditions, high temperatures, or mechanical removal. There are no known stereolithography formulations that allow the rapid, convenient removal of a sacrificial layer by using water alone. There is a commercial desire for radical-curable, cationic-curable, or hydrosilylation-curable resin formulations for producing a sacrificial layer or structure that is easily hydrolysable in water, for quick removal on demand.

SUMMARY OF THE INVENTION

The present invention addresses the aforementioned needs in the art, as will now be summarized and then further described in detail below.

Some variations provide a curable resin formulation for a water-decomposable thermoset material, the curable resin formulation comprising:

(a) one or more first molecules containing (i) at least one boron-oxygen-silicon group (i.e., a B—O—Si sequence) and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

Some variations provide a curable resin formulation for a water-decomposable thermoset material, the curable resin formulation comprising:

(a) one or more first molecules containing (i) at least one polyester group (i.e., a O—C=O sequence) and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

In some embodiments, the curable resin formulation contains boron, oxygen, and silicon in a combined concentration from about 1 wt % to about 99.9 wt %, such as from about 10 wt % to about 90 wt %.

In some embodiments, the curable resin formulation contains a polyester backbone from about 25 wt % to about 99 wt % of the curable resin formulation.

The first functional group may be selected from the group consisting of vinyl, vinyl ether, allyl, alkyne, cyanate, acrylate, methacrylate, thiol, amine, epoxy, cycloaliphatic epoxy, alcohol, oxetane, hydrosilane, and combinations thereof.

In some embodiments, the first molecules are selected from the group consisting of tris(vinyldimethylsiloxy)boron, dichlorodimethylsilane, reaction products of boric acid and silanes, reaction products of boric acid and silanols, and combinations thereof. In other embodiments, the first molecules are selected from the group consisting of glycolide diacrylate, glycolide dimethacrylate, lactide diacrylate, lactide dimethacrylate, and combinations thereof.

In some embodiments, the curable resin formulation includes one or more second molecules. The second molecules may be selected from the group consisting of saturated or unsaturated hydrocarbons, aromatic hydrocarbons, siloxanes, alkylsiloxanes, esters, ethers, urethanes, carbonates, amines, amides, and combinations, polymers, or copolymers thereof, for example. In various embodiments, the second molecules are selected from the group consisting of trimethylolpropane tris(3-mercaptopropionate), pentaerythritol tetrakis(3-mercaptopropionate), polyethylene glycol dimethacrylate, polyethylene glycol diacrylate, trivinylcyclohexane, triethylene glycol ethyl ether methacrylate, methoxypolyethylene glycol monoacrylate, polypropylene glycol dimethacrylate, tricyclodecane dimethanol diacrylate, vinyl-terminated poly(dimethylsiloxane), hydride-terminated polydimethylsiloxane, polymethylhydrosiloxanes, polymethylvinylsiloxanes, epoxy-functional silicones, methacrylate-functional silicones, acrylate-functional silicones, mercapto-functional silicones, and combinations, polymers, or copolymers thereof.

The second functional group may be selected from the group consisting of vinyl, allyl, thiol, mercaptan, acrylate, methacrylate, alkene, alkyne, epoxy, hydrosilane, and combinations thereof, for example.

In some embodiments, the initiator is selected from the group consisting of a photoinitiator, a thermal free-radical initiator, a cationic initiator, a hydrosilylation catalyst, and combinations thereof. For example, the initiator may be selected from the group consisting of azobisisobutyronitrile, 1,1'-azobis(cyclohexanecarbonitrile), benzoyl peroxide, di-tert-butyl peroxide, methyl ethyl ketone peroxide, 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, sulfonium-iodonium-ferrocenium salts, cyclopentadienylcumene-iron hexafluorophosphate, diphenyliodonium phosphate, triarylsulfonium hexafluoroantimonate, platinum-carbonyl-cyclovinylmethylsiloxane complex, platinum-divinyltetramethyldisiloxane complex, platinum(II) acetylacetonate, and combinations thereof. The initiator may be present in a concentration from about 0.001 wt % to about 10 wt % of the curable resin formulation, for example.

In some embodiments, the curable resin formulation further comprises a solvent in a concentration from about 0.1 wt % to about 90 wt % of the curable resin formulation. The solvent may be selected from water, hydrocarbons, oils, ketones, alcohols, aromatics, or combinations thereof, for example.

The curable resin formulation may optionally contain one or more free-radical inhibitors, hydrogen donors, UV sensitizers, 3D-print resolution agents, and/or solid fillers, for example.

Other variations of the invention provide a cured, water-decomposable thermoset solid material comprising a plurality of molecules containing (i) at least one boron-oxygen-silicon group and/or at least one polyester group and (ii) functional groups that connect the plurality of molecules together in a polymer, wherein the cured, water-decomposable thermoset solid material is characterized by at least 50 wt % decomposition in water with a pH of 7, for 60 minutes, at a temperature of 100° C.

The cured, water-decomposable thermoset solid material may be derived from a curable resin formulation comprising:

(a) one or more first molecules containing (i) at least one boron-oxygen-silicon group and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

The cured, water-decomposable thermoset solid material may be derived from a curable resin formulation comprising:

(a) one or more first molecules containing (i) at least one polyester group and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

The cured, water-decomposable thermoset solid material may contain boron, oxygen, and silicon in a combined concentration from about 1 wt % to about 99.9 wt %. Alternatively, or additionally, the cured, water-decomposable thermoset solid material may contain a polyester backbone from about 25 wt % to about 99 wt %.

The functional groups connecting the plurality of molecules together may be selected from the group consisting of vinyl, vinyl ether, allyl, alkyne, cyanate, acrylate, methacrylate, thiol, amine, epoxy, cycloaliphatic epoxy, alcohol, oxetane, hydrosilane, and combinations thereof.

The cured, water-decomposable thermoset solid material may contain at least two different functional groups selected from the group consisting of vinyl, vinyl ether, allyl, alkene, alkyne, cyanate, acrylate, methacrylate, thiol, mercaptan, amine, epoxy, cycloaliphatic epoxy, alcohol, oxetane, hydrosilane, and combinations thereof.

In some embodiments, the cured, water-decomposable thermoset solid material is characterized by at least 50 wt % decomposition in water with a pH of 7, for 60 minutes, at a temperature of 100° C. In certain embodiments, the cured, water-decomposable thermoset solid material can be decomposed at room temperature over a period of many hours.

The cured, water-decomposable thermoset solid material may be contained in a coating, film, layer, region of material, or three-dimensional structure, for example.

Other variations provide a method of making a water-decomposable thermoset solid material, the method comprising:

(a) providing one or more first molecules containing (i) at least one boron-oxygen-silicon group and/or at least one polyester group and (ii) at least one first functional group that is reactive for free-radical polymerization, cationic polymerization, and/or hydrosilylation polymerization;

(b) optionally providing one or more second molecules containing at least one second functional group that is reactive with the first molecules;

(c) providing an initiator for free-radical polymerization, cationic polymerization, and/or hydrosilylation polymerization;

(d) combining the first molecules, optionally the second molecules, and the initiator to form a reaction mixture, and subjecting the reaction mixture to effective reaction conditions to polymerize the first molecules, and optionally the second molecules, via free-radical polymerization, cationic polymerization, and/or hydrosilylation polymerization, thereby generating a water-decomposable thermoset solid material; and (e) recovering the water-decomposable thermoset solid material.

In some embodiments, the water-decomposable thermoset solid material is a sacrificial coating. In some embodiments, the water-decomposable thermoset solid material is a sacrificial region or layer within a three-dimensional structure. In other embodiments, the water-decomposable thermoset solid material is itself a structural object, i.e. without necessarily containing another, non-water-decomposable solid material.

In some embodiments, the method further comprises exposing the water-decomposable thermoset solid material to water with a pH in the range of about 4 to about 10, for a time from about 1 minute to about 8 hours, at a temperature from about 50° C. to about 200° C. In certain embodiments, the pH is in the range of about 6 to about 8, the time is from about 5 minutes to about 2 hours, and the temperature is from about 75° C. to about 150° C.

The step of exposing the water-decomposable thermoset solid material to water is typically conducted at a later time after a period of storage, transport, or use, and when it becomes desired to intentionally decompose the thermoset solid material. In some embodiments, at least 50 wt % of the water-decomposable thermoset solid material is hydrolyzed and dissolved into the water. In certain embodiments, at least 90 wt % of the water-decomposable thermoset solid material is hydrolyzed and dissolved into the water.

DETAILED DESCRIPTION OF EMBODIMENTS OF THE INVENTION

Figure 1:
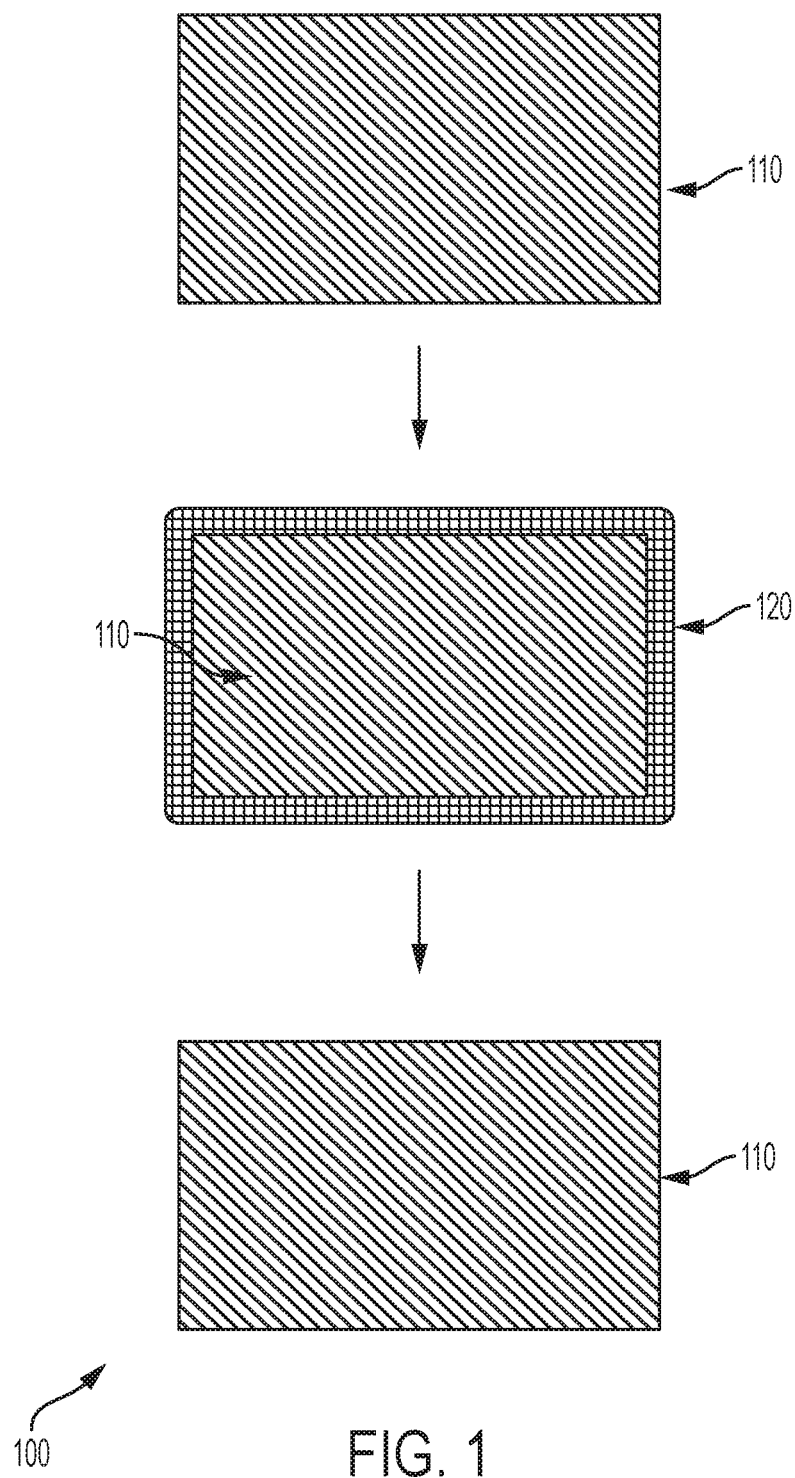
FIG. 1 depicts a cured, water-decomposable thermoset solid material employed as a sacrificial coating, in some embodiments.

The compositions (also referred to as formulations), structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention is premised, at least in part, on a polymer resin formulation that can be cured to make a two-dimensional (2D) or three-dimensional (3D) structure that can be readily hydrolyzed in water. The curable resin formulation contains chemical bonds that are highly susceptible to water. The resin formulations disclosed herein span across many applications that require a rapidly hydrolysable material and a removal method that does not involve the use of corrosive etching or extreme temperatures to remove or dissolve the material. This type of technology is useful for applications such as temporary protective coatings, water-soluble films, porous networks, and sacrificial layers for 3D printing.

For example, the application of UV-based 3D printing for fabricating structural components often requires a sacrificial layer to provide support during fabrication. After fabrication of the structural component, the sacrificial layer may then be removed using a convenient, selective etch with water, as disclosed herein. This process, especially in the fabrication of parts using 3D-printing processes such as vat polymerization, stereolithography (SLA), polyjetting, and/or self-propagating photopolymer waveguide polymerization, allows for an easily decomposable polymer structure. The polymer may be utilized as a readily removable support layer, without exposing the structural components to potentially harmful conditions. In some embodiments, the printed part may be a sacrificial template for casting or receiving coatings which, after being removed from the template, turn into a hollow shell composed of the 2D coating.

There are no known stereolithography formulations that can quickly be hydrolyzed in water without the use of strongly acidic (i.e., pH<4) or strongly basic (i.e., pH>10) conditions. This disclosure provides a chemical formulation that can be used as a sacrificial layer or support, but expressly is not limited to this specific application.

Sacrificial support layers and structures are needed in applications such as micromachining of microelectromechanical systems (MEMS) or the production of parts using 3D printing and stererolithography. In micromachining, sacrificial layers are employed to help with patterning and fabricating MEMS structures. In stereolithography, the need for sacrificial supports is highly dependent on the design of a part. Sacrificial supports are used to stabilize the part shape, especially if there are regions that may overhang. In addition to use as a supporting material, sacrificial 3D-printing material may be used for component fabrication. For example, 3D-printed components may be used as templates in casting or coating processes.

Printed polymer components are often used as a positive template for making a negative mold for casting, by encasing the printed component in casting media, such as sands or plasters. The mold is set and the polymer component removed, often with harsh chemicals or burning. It is beneficial to be able to wash the component away with water or an aqueous liquid.

Printed components may also be used as templates for coating materials where the printed component is coated in a second material through a new process such as electroplating, dip coating, chemical or physical vapor deposition, electroless plating, slip casting, slurry coating, or spray coating, for example. In some embodiments, it is desirable to obtain a part where just the shell remains. The decomposable resins described herein allow easy removal of the template, avoiding damage to the coating and leaving its integrity intact.

In some variations, the water-decomposable property of the polymer is provided by the incorporation of boron-oxygen-silicon groups —B—O—Si—, also referred to equivalently as silylborate, siloxyboron, or borasiloxane groups, which hydrolyze readily in water. This water-decomposable functionality may be combined with other functional groups that have reactivity for radical-initiated reactions or cationic polymerization, for example.

As one example, boron vinyldimethylsiloxide contains vinyl silyl groups that are reactive functional groups and that can undergo UV-initiated free-radical polymerization, thermally initiated free-radical polymerization, cationic polymerization, and/or hydrosilyation to form a crosslinked network. The boron-oxygen-silicon group is moisture-sensitive with the ability to hydrolyze across the oxygen-silicon bond, forming boric acid. Species containing boron-oxygen-silicon groups may be used both as structural components and as decomposition triggers (when exposed to water) within various resin formulations.

Alternatively, or additionally, components may be chosen to have a high content of polyester groups —C(=O)—O— in the backbone, in order to be readily hydrolysable in water. This water-decomposable functionality may be combined with other functional groups that have reactivity for radical-initiated reactions or cationic polymerization, for example. Exemplary components with high polyester content include, but are not limited to, polyglycolide diacrylate, polyglycolide dimethacrylate, polylactide diacrylate, polylactide dimethacrylate, or combinations thereof.

The curable resin formulation contains a chemical compound that is multifunctional, capable of reacting with other species to form a crosslinked network during curing. Curing may be accomplished by various chemical methods, such as (but not limited to) UV-based free-radical curing, thermal free-radical curing, UV-based cationic curing, or hydrosilylation.

In order to undergo UV-based polymerization reactions, borosiloxane groups are preferably covalently linked to other functional groups that can undergo these polymerization reactions. These functional groups include, but are not limited to, carbon-carbon double bonds (e.g., alkenes) and carbon-carbon triple bonds (e.g., alkynes). Other functional groups may include vinyl, vinyl ether, allyl, acrylate, methacrylate, thiol, epoxy, cycloaliphatic epoxy, alcohol, oxetane, or a combination thereof. One example of a chemical that includes a borosiloxane group as well as a suitable functional group for reaction is tris(vinyldimethylsiloxy)boron.

Some variations provide a formulation that includes from about 1 wt % to about 99.9 wt % of a liquid resin containing borosiloxane and/or polyester groups. This liquid resin is curable to produce a solid-state material in the form of a film, coating, or three-dimensional structure, for example. In one embodiment, tris(vinyldimethylsiloxy)boron having vinyl functional groups is combined with another monomer having thiol functionality for a UV-activated thiol-ene reaction. In another embodiment, tris(vinyldimethylsiloxy)boron is blended with monomers containing vinyl, allyl, acrylate, and/or methacrylate groups.

As intended herein, a "resin" means a material that is capable of being polymerized or cured, further polymerized or cured, or crosslinked. Resins may include monomers, oligomers, prepolymers, or mixtures thereof. As used herein, "polymer resin" means monomer, oligomer, prepolymer, or other molecule that is converted to a polymer.

"Radiation-curable" in this disclosure is synonymous with "electromagnetic radiation-curable." All references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays.

As used herein, a "UV-active functional group" is a chemical group in the form of multiple atoms bonded together in a functional group that has absorption in the UV or visible region of electromagnetic radiation (wavelengths from about 100 nm to about 700 nm). Absorption (UV activity) occurs when a UV-active molecule absorbs ultraviolet or visible light that excites valence electrons, causing an electronic transition from a ground state to an excited state. UV absorption can be measured by a UV-visible spectrophotometer, which provides a spectrum of absorption versus wavelength.

Some variations of the invention provide a curable resin formulation for a water-decomposable thermoset material, the curable resin formulation comprising:

(a) one or more first molecules containing (i) at least one boron-oxygen-silicon group (i.e., B—O—Si sequence) and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

Some variations provide a curable resin formulation for a water-decomposable thermoset material, the curable resin formulation comprising:

(a) one or more first molecules containing (i) at least one polyester group (i.e., a O—C=O sequence) and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

In some embodiments, the curable resin formulation contains boron, oxygen, and silicon in a combined concentration from about 1 wt % to about 99.9 wt %, such as from about 10 wt % to about 90 wt %. In various embodiments, the combined concentration of boron, oxygen, and silicon is about, or at least about, 5, 10, 20, 30, 40, 50, 60, 70, 80, or 90 wt % of the curable resin formulation.

In some embodiments, the curable resin formulation contains a polyester backbone from about 25 wt % to about 99 wt % of the curable resin formulation. A polyester backbone consists of polymer repeat units containing the —C(=O)—O— sequence and any atoms or molecules that are bonded to the carbon atom and/or any atoms or molecules that are bonded to the single-bond oxygen atom. In various embodiments, the polyester backbone is about, or at least about, 5, 10, 20, 30, 40, 50, 60, 70, 80, or 90 wt % of the curable resin formulation.

The first functional group may be selected from the group consisting of vinyl, vinyl ether, allyl, alkyne, cyanate, acrylate, methacrylate, thiol, amine, epoxy, cycloaliphatic epoxy, alcohol, oxetane, hydrosilane, and combinations thereof. In some embodiments, the first functional group is a UV-active functional group.

In some embodiments, the first functional group is reactive for hydrosilylation polymerization. Hydrosilylation is a well-known methodology in organic synthesis. In hydrosilylation polymerization, addition of a hydrosilyl (Si—H) group across double bonds may be used to prepare polymers. Hydrosilylation polymerization of difunctional organosilicon monomers containing alkenyl or alkynyl groups and/or Si—H bonds provides saturated or unsaturated organosilicon polymers bearing Si—C bonds in the backbone. The mechanism may involve intermolecular hydrosilylation polymerization of alkenyl (or alkynyl) hydrosilanes and/or the polyhydrosilylation of dienes or diynes with dihydro-substituted organosilicon compounds, for example. Hydrosilylation polymerization may be catalyzed, such as with a platinum group metal catalyst.

The first molecules may be selected from the group consisting of tris(vinyldimethylsiloxy)boron, dichlorodimethylsilane, reaction products of boric acid and silanes, reaction products of boric acid and silanols, and combinations thereof. In other embodiments, the first molecules are selected from the group consisting of glycolide diacrylate, glycolide dimethacrylate, lactide diacrylate, lactide dimethacrylate, and combinations thereof. The first molecules may be linear, cyclic, or branched molecules, which may be monomers, oligomers, or polymers.

In certain embodiments, the first molecules containing only one O—C=O sequence that is not repeated; for present purposes this O—C=O sequence (ester group) is regarded as a polyester group. Also note that the O—C=O sequence of the polyester group may be: fully contained within a single repeat unit; a sequence in which the O atom with single bond to C atom is contained in a repeat unit but the —C=O subgroup is not contained in that repeat unit; a sequence in which the —C=O subgroup is contained in a repeat unit but the O atom with single bond to C atom is not contained in that repeat unit; or a combination thereof.

In some embodiments, the curable resin formulation includes one or more second molecules. The second molecules may be selected from the group consisting of saturated or unsaturated hydrocarbons, aromatic hydrocarbons, siloxanes, alkylsiloxanes, esters, ethers, urethanes, carbonates, amines, amides, and combinations, polymers, or copolymers thereof, for example. The second molecules may be linear, cyclic, or branched molecules, which may be monomers, oligomers, or polymers.

In some preferred embodiments, the second molecules have good solubility in water. For example, the second molecules may be characterized by a solubility in water (at 25° C. with pH=7) of at least 10 wt %, preferably at least 50 wt %, more preferably at least 75 wt %, and most preferably at least 90 wt %, such as 95 wt %, 99 wt %, or 100 wt % (which means all of the second molecules are water-soluble).

Alternatively, or additionally, the solubility of the second molecules may be characterized in that at most 10 parts by weight water are required to dissolve 1 part by weight of second molecules—i.e., a 10:1 water:(second molecules) ratio, preferably at most 5:1, more preferably at most 2:1, and most preferably at most 1:1—which may be classified as being very soluble in water.

The second molecules may be selected from the group consisting of trimethylolpropane tris(3-mercaptopropionate), pentaerythritol tetrakis(3-mercaptopropionate), polyethylene glycol dimethacrylate, polyethylene glycol diacrylate, trivinylcyclohexane, triethylene glycol ethyl ether methacrylate, methoxypolyethylene glycol monoacrylate, polypropylene glycol dimethacrylate, tricyclodecane dimethanol diacrylate, vinyl-terminated poly(dimethylsiloxane), hydride-terminated polydimethylsiloxane, polymethylhydrosiloxanes, polymethylvinylsiloxanes, epoxy-functional silicones, methacrylate-functional silicones, acrylate-functional silicones, mercapto-functional silicones, and combinations, polymers, or copolymers thereof.

The second molecules each contain at least one second functional group, and preferably at least two second functional groups. The second functional group may be selected from the group consisting of vinyl, allyl, thiol, mercaptan, acrylate, methacrylate, alkene, alkyne, epoxy, hydrosilane, and combinations thereof, for example. In some embodiments, at least one of the second functional groups is a UV-active functional group.

In some embodiments, the initiator is selected from the group consisting of a photoinitiator, a thermal free-radical initiator, a cationic initiator, a hydrosilylation catalyst, and combinations thereof.

For example, the initiator may be selected from the group consisting of azobisisobutyronitrile, 1,1'-azobis(cyclohexanecarbonitrile), benzoyl peroxide, di-tert-butyl peroxide, methyl ethyl ketone peroxide, 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, sulfonium-iodonium-ferrocenium salts, cyclopentadienylcumene-iron hexafluorophosphate, diphenyliodonium phosphate, triarylsulfonium hexafluoroantimonate, platinum-carbonyl-cyclovinylmethylsiloxane complexes, platinum-divinyltetramethyldisiloxane complexes, platinum(II) acetylacetonate, and combinations thereof.

The initiator may be a free-radical initiator that generates free radicals to accelerate radical reactions, or a hydrosilylation catalyst such as a platinum group metal catalyst. The initiator may be activated via thermal exposure to a decomposition temperature to cause intramolecular bond cleavage or hydrogen abstraction, for example. Examples of free-radical initiators include, but are not limited to, azobisisobutyronitrile, 1,1'-azobis(cyclohexanecarbonitrile), benzoyl peroxide, di-tert-butyl peroxide, methyl ethyl ketone peroxide, or combinations thereof. Examples of hydrosilylation catalysts include, but are not limited to, a platinum-carbonyl-cyclovinylmethylsiloxane complex, a platinum-divinyltetramethyldisiloxane complex, platinum(II) acetylacetonate, or combinations thereof.

In some embodiments, the initiator is a photoinitiator activated via exposure to light having a wavelength from about 200 nm to about 500 nm to cause intramolecular bond cleavage and/or hydrogen abstraction. Examples of photoinitiators include, but are not limited to, 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; thioxanones; or combinations thereof.

In some embodiments, the initiator is a cationic photoinitiator or photoacid generator, such as sulphonium, iodonium, and ferrocenium cations paired with a non-nucleophilic anion, forming an onium salt. The salt under light exposure creates Brønsted acids (proton donors) by cleavage of the sulphonium, iodonium, and ferrocenium cation of the onium salt. Cationic photoinitiators are typically active under wavelengths from 200 nm to 350 nm. Initiators that are active at longer wavelengths may be utilized. Examples of cationic photoinitiators include, but are not limited to, sulfonium-iodonium-ferrocenium salts, cyclopentadienylcumene-iron hexafluoro phosphate, diphenyliodonium phosphate, triarylsulfonium hexafluoroantimonate, or combinations thereof.

A combination of different types of initiators may be used in the polymerization process, resulting in different reaction rates initiated by the different initiators. Also, a hydrogen donor may be employed to assist in the generation of a Brønsted acid or in acceleration of anionic photoinitiator reactions. Hydrogen donors may include alcohols, ethers, esters, and/or water, with tertiary amines being one preferred embodiment when hydrogen donors are included.

The initiator(s) may be present in a concentration from about 0.001 wt % to about 10 wt % of the curable resin formulation, for example. In various embodiments, one or more initiators are present at about 0.01 wt %, 0.1 wt %, 0.5 wt %, 1 wt %, 2 wt %, or 5 wt % of the curable resin formulation.

The curable resin formulation may optionally contain one or more free-radical inhibitors, hydrogen donors, UV sensitizers, 3D-print resolution agents, and/or solid fillers, for example.

In some embodiments, a free-radical inhibitor (antioxidant) is added in a sufficient amount to the curable resin formulation to inhibit unwanted polymerization of regions outside the desired printing area so as to allow sufficient resolution to the desired part. Examples of free-radical inhibitors include, but are not limited to, hydroquinone; methylhydroquinone; ethylhydroquinone; methoxyhydroquinone; ethoxyhydroquinone; monomethylether hydroquinone; propylhydroquinone; propoxyhydroquinone; tert-butylhydroquinone; n-butylhydroquinone; nitrosophenylhydroxylamine aluminum salt; or combinations thereof. The free-radical inhibitor may be suitably selected to be from about 0 to about 5% by weight, such as from about 0.001 wt % to about 1 wt %, of the curable resin formulation.

In some embodiments, a UV sensitizer may be included in the curable resin formulation. A UV sensitizer enables long-UV-wavelength reactions of UV systems with photoinitiators which typically absorb at shorter wavelengths. This is typically the case with cationic photoinitiators, which are generally limited to absorption in the 300-400 nm range. UV sensitizers interact with UV light at longer wavelengths, generally longer than 400 nm, and then interact with the photoinitiator to create free radicals and/or Brønsted acids. The UV sensitizer forms an excited triplet state under UV light absorption, and then, through electron or energy transfer, can react with a photoinitiator to generate free radicals and/or Brønsted acids, thereby initiating photopolymerizaton.

The UV sensitizer may be suitably selected to be from about 0 to about 5% by weight, such as from about 0.001 wt % to about 1 wt %, of the curable resin formulation.

In some embodiments, the curable resin formulation includes one or more 3D-print resolution agents. 3D-print resolution agents may be selected from UV absorbers, fluorescents, optical brighteners, inks, or a combination thereof. In some embodiments, a 3D-print resolution agent absorbs light at a desired wavelength and converts the energy into thermal energy or into radiation at a higher wavelength. The use of 3D-print resolution agents improves print quality and resolution by containing the curing to the desired region of the laser or light exposure, laterally and vertically in the print bath. Examples of 3D-print resolution agents include, but are not limited to, 2-(2-hydroxyphenyl)-benzotriazole, 2-hydroxyphenyl-benzophenones, 2-hydroxyphenyl-s-triazines, 2,2'-(2,5-thiophenediyl)bis(5-tert-butylbenzoxazole), ethenediyl)bis(4,1-phenylene) bisbenzoxazole, or combinations thereof.

In certain embodiments, the curable resin formulation includes one or more solid filler materials. The geometric shape of the solid filler material may be fibers, short fibers (1-100 micrometers), whiskers, nanotubes, nanorods, flat platelets, microparticles with diameters between 1 and 100 micrometers, nanoparticles with diameters between 1 and 1000 nanometers, or a combination thereof. To increase fracture toughness of a 3D-printed part, fillers with high aspect ratio are preferred, such as fibers, short fibers, whiskers, nanotubes, and/or nanorods. The optional solid filler material may be present in the curable resin formulation at a concentration from about 0.1 vol % to about 70 vol % of the curable resin formulation, for example.

In some embodiments, the curable resin formulation further comprises a solvent in a concentration from about 0.1 wt % to about 99 wt % of the curable resin formulation. For example, the solvent may be in a concentration of about 1 wt %, 5 wt %, 10 wt %, 25 wt %, 50 wt %, 75 wt %, or 90 wt % of the curable resin formulation. Solvents may be used to aid in solubility and enhanced miscibility, for dilution, for mixing and mass transfer, for heat transfer, or for other reasons. Solvents may be selected from water, hydrocarbons, oils, ketones, alcohols, aromatics, or combinations thereof. Without limitation, certain exemplary solvents are acetone, water, or a mixture thereof.

In curing (e.g. exposure to UV light), the first molecules and, when present, the second molecules react to form a thermoset polymer material. The reaction may include various types of chemistry, such as thiol-ene reactions, hydrosilylation, free-radical oligomerization or polymerization, and/or cationic oligomerization or polymerization, for example. This polymer material may form one or more sacrificial layers or regions within an object or part, such as a 3D-printed part. The polymer material contains at least one —B—O—Si— group and/or at least one —C(=O)—O— group, rendering the polymer material hydrolysable.

A "thermoset" polymer or solid material is a material that is irreversibly cured from a soft solid or viscous liquid, prepolymer, or resin. The process of curing changes the resin into a hard, crosslinked polymer network. Once hardened, a thermoset material cannot be reheated and melted to be shaped differently. Thermoset materials are contrasted with thermoplastic materials, which may be remelted and reshaped due to the absence of crosslinks. In the present invention, the thermoset material cannot generally be melted and reshaped, but it can be decomposed with water under suitable conditions, as taught herein.

As intended in this specification, "decomposition" of a thermoset solid material means that the thermoset solid material undergoes one or more of hydrolysis, depolymerization (into monomers or oligomers), polymer defragmentation (into oligomers or random fragments), or polymer degradation (into random fragments or side products). A "water-decomposable" thermoset solid material is a thermoset solid material that, in the presence of water, undergoes decomposition effective for dissolution of at least some of the thermoset solid material into the water or an aqueous liquid containing the water.

In some embodiments, decomposition is specifically via hydrolysis. A "hydrolysable" thermoset solid material is a water-decomposable thermoset solid material that undergoes hydrolysis by chemical reaction with water molecules, causing dissolution of at least some of the thermoset solid material into water or an aqueous liquid.

Some variations of the invention provide a cured, water-decomposable thermoset solid material comprising a plurality of molecules containing (i) at least one boron-oxygen-silicon group and/or at least one polyester group and (ii) functional groups that connect the plurality of molecules together in a polymer, wherein the cured, water-decomposable thermoset solid material is characterized by the property of at least 50 wt % decomposition in water with a pH of 7, for 60 minutes, at a temperature of 100° C.

In some embodiments, the cured, water-decomposable thermoset solid material is characterized by the property of at least 60 wt %, at least 70 wt %, at least 80 wt %, at least 90 wt %, at least 95 wt %, or at least 99 wt % decomposition (e.g., hydrolysis) in water with a pH of 7, for 60 minutes, at a temperature of 100° C. That is, the water-decomposable thermoset solid material, when exposed to a test with these aqueous conditions of pH, time, and temperature, undergoes the stated minimum decomposition (e.g., hydrolysis). This is therefore a material property, not a recitation of a method of using the material. In certain embodiments, essentially all of the cured, water-decomposable thermoset solid material decomposes (e.g., hydrolyzes) when tested in water with a pH of 7, for 60 minutes, at a temperature of 100° C.

In some embodiments, the cured, water-decomposable thermoset solid material is characterized by the property of at least 50 wt % decomposition (e.g., hydrolysis) in water with a pH of about 4, about 5, about 6, about 7, about 8, about 9, or about 10, for 60 minutes, at a temperature of 100° C.

In some embodiments, the cured, water-decomposable thermoset solid material is characterized by the property of at least 50 wt % decomposition (e.g., hydrolysis) in water with a pH of about 7, for about 1 minute, about 5 minutes, about 10 minutes, about 30 minutes, about 1 hour, about 2 hours, about 4 hours, or about 8 hours, at a temperature of 100° C.

In some embodiments, the cured, water-decomposable thermoset solid material is characterized by the property of at least 50 wt % decomposition (e.g., hydrolysis) in water with a pH of about 7, for about 60 minutes, at a temperature of about 25° C., about 50° C., about 75° C., about 100° C., about 125° C., or about 150° C.

The system pressure for decomposing the water-decomposable thermoset solid material is not regarded as critical and may vary. For example, in some embodiments, the system pressure is atmospheric pressure (1 bar). In various embodiments, the system pressure is about 0.01 bar, 0.1 bar, 0.5 bar, 0.9 bar, 1 bar, 1.1 bar, 1.5 bar, 2 bar, 3 bar, 4 bar, 5 bar, 10 bar, or higher. The system pressure may be adjusted by known means, such as with a vacuum pump and/or with the addition of an inert gas (e.g., $N_2$, Ar, or $CO_2$) to the system, for example.

It is also possible to dissolve the water-decomposable thermoset solid material in water at room temperature and atmospheric pressure over long periods of time, such as many hours, or days. In some embodiments, cured, water-decomposable thermoset solid material is characterized by the property of at least 50 wt %, at least 60 wt %, at least 70 wt %, at least 80 wt %, or at least 90 wt % decomposition (e.g., hydrolysis) in water with a pH of about 7, at a temperature of about 20° C., for a time period from 4 hours to 24 hours.

The cured, water-decomposable thermoset solid material may be derived from a curable resin formulation comprising:

(a) one or more first molecules containing (i) at least one boron-oxygen-silicon group and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

The cured, water-decomposable thermoset solid material may be derived from a curable resin formulation comprising:

(a) one or more first molecules containing (i) at least one polyester group and (ii) at least one first functional group that is reactive for free-radical polymerization, cationic polymerization, and/or hydrosilylation polymerization;

(b) optionally one or more second molecules containing at least one second functional group that is reactive with the first molecules; and (c) an initiator for free-radical polymerization, cationic polymerization, and/or hydrosilylation polymerization.

The cured, water-decomposable thermoset solid material may be contained in a coating, film, layer, region of material, or three-dimensional structure, for example.

For example, FIG. 1 depicts an exemplary water-decomposable thermoset system 100. An initial substrate or object 110 is first coated with a coating 120 containing a cured, water-decomposable thermoset solid material as disclosed herein. At a later time, the water-decomposable thermoset solid material is decomposed in the presence of water or an aqueous liquid, removing the coating 120 from the substrate or object 110, as shown in FIG. 1. The geometry of the initial substrate or object 110 is arbitrary and unlimited. Note that this drawing implies all of the coating 120 is removed, but in certain embodiments, only a portion (e.g., about 50-95 wt %) of the coating 120 is removed via decomposition (e.g., hydrolysis).

Figure 2:
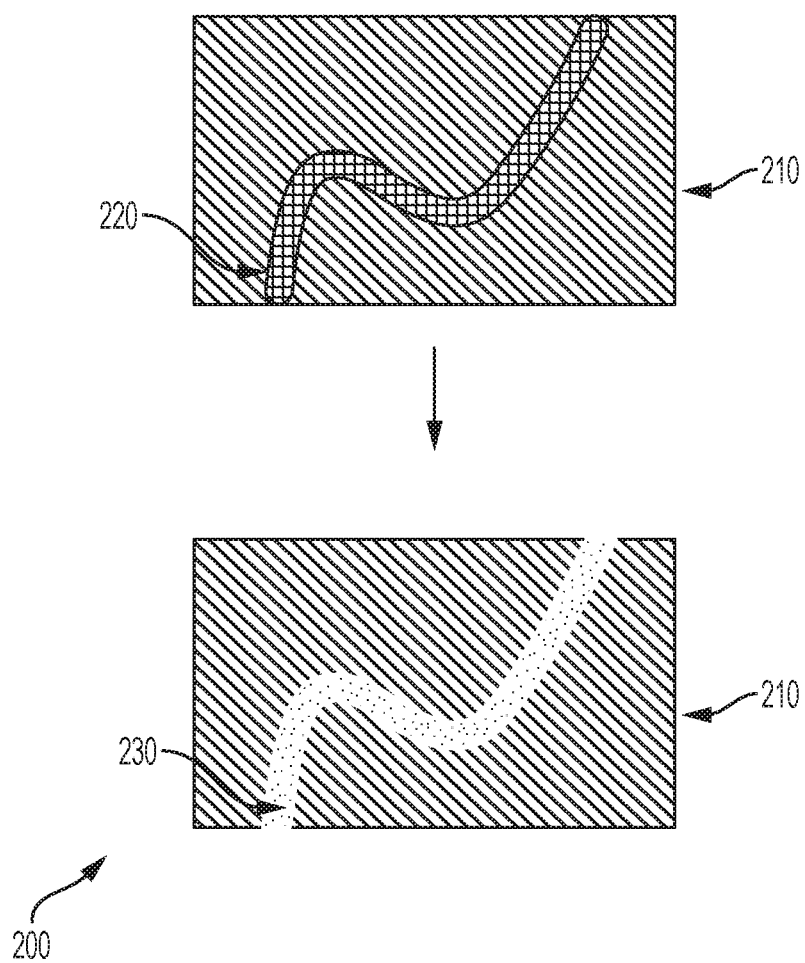
FIG. 2 depicts a cured, water-decomposable thermoset solid material employed as a sacrificial region to form a geometric feature, in some embodiments.

As another example, FIG. 2 depicts an exemplary water-decomposable thermoset system 200. An initial object 210 includes a feature precursor 220 that contains a cured, water-decomposable thermoset solid material as disclosed herein. The water-decomposable thermoset solid material is decomposed in the presence of water or an aqueous liquid, removing the feature precursor 220 from the object 210, to form the feature 230, as shown in FIG. 2. The geometry of the feature 230 is arbitrary, and instead of (or in addition to) being a tortuous pore as shown, it could be a linear pore, a series of lines, dots, channels, or any other 1D, 2D, or 3D pattern. Note that this drawing implies all of the feature precursor 220 is removed (and converted to feature 230), but in certain embodiments, only a portion (e.g., about 50-95 wt %) of the feature precursor 220 is removed via decomposition (e.g., hydrolysis). The initial object 210 may contain other materials such as thermoplastic polymers, in addition to the feature precursor 220 that contains a thermoset solid material.

Figure 3:
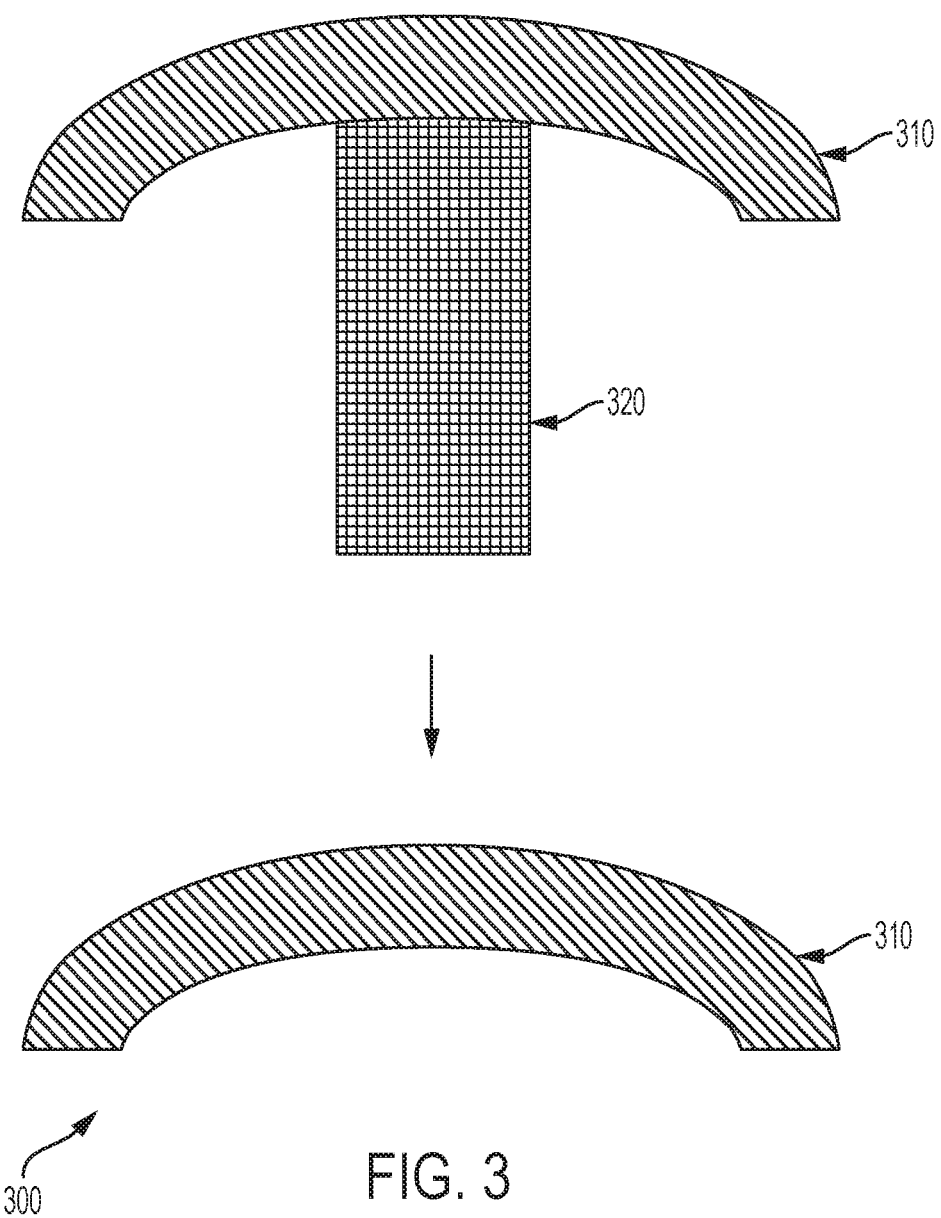
FIG. 3 depicts a cured, water-decomposable thermoset solid material employed as a temporary support structure for a 3D-printed object, in some embodiments.

As another example, FIG. 3 depicts an exemplary water-decomposable thermoset system 300. An initial object 310 is physically supported by a support structure 320 that contains a cured, water-decomposable thermoset solid material as disclosed herein. The water-decomposable thermoset solid material is decomposed in the presence of water or an aqueous liquid, removing the support structure 320 from the object 310, as shown in FIG. 3. The geometry of the object 310 is arbitrary and is shown in FIG. 3 as an arch, without limitation. The object 310 may be any part that can be 3D-printed. The geometry of the support structure 320 may be selected as needed to provide a support function for a 3D-printing process. Multiple support structures may be utilized. Preferably, most or all of the support structure 320 is removed via decomposition (e.g., hydrolysis). It is possible for some of the support structure 320 to remain intentionally, or for residual support material to be removed by mechanical or other means.

The step of exposing the water-decomposable thermoset solid material to water or aqueous liquid is typically conducted at a later time after a period of storage, transport, or use, and when it becomes desired to intentionally decompose at least some of the thermoset solid material. As will be recognized by a skilled artisan, various periods of time may be used, depending on the application. For example, the sacrificial coating 120 of FIG. 1 may remain on the object 110 for minutes, hours, days, weeks, months, or even years before the coating is intentionally removed for any reason. The feature precursor 220 of FIG. 2 may remain within the object for minutes, hours, days, or weeks, months, or years, for example, before selectively etching out the water-decomposable thermoset solid material to form the feature 230. The support structure 320 of FIG. 3 may remain in physical communication with the object 310 for seconds, minutes, hours, or days, weeks, months, or years, for example, before removing the water-decomposable thermoset solid material from the 3D-printed part 310.

Other variations provide a method of making a water-decomposable thermoset solid material, the method comprising:

(a) providing one or more first molecules containing (i) at least one boron-oxygen-silicon group and/or at least one polyester group and (ii) at least one first functional group that is reactive for free-radical polymerization, cationic polymerization, and/or hydrosilylation polymerization;

(b) optionally providing one or more second molecules containing at least one second functional group that is reactive with the first molecules;

(c) providing an initiator for free-radical polymerization, cationic polymerization, and/or hydrosilylation polymerization;

(d) combining the first molecules, optionally the second molecules, and the initiator to form a reaction mixture, and subjecting the reaction mixture to effective reaction conditions to polymerize the first molecules, and optionally the second molecules, via free-radical polymerization, cationic polymerization, and/or hydrosilylation polymerization, thereby generating a water-decomposable thermoset solid material; and (e) recovering the water-decomposable thermoset solid material.

Step (b) is optional because the first molecules may have sufficient functionality (e.g., acrylate or methacrylate functionality) such that the first molecules can be polymerized by themselves with an initiator.

In some embodiments, the water-decomposable thermoset solid material is a sacrificial coating. In some embodiments, the water-decomposable thermoset solid material is a sacrificial region or layer within a three-dimensional structure. In other embodiments, the water-decomposable thermoset solid material is itself a structural object, i.e. without necessarily containing another, non-water-decomposable solid material. In some embodiments, the water-decomposable thermoset solid material forms a support structure to be removed from a primary structure, which may or may not be fabricated from the same material as the support structure.

In some embodiments, the method further comprises exposing the water-decomposable thermoset solid material to water with a pH in the range of about 4 to about 10, for a time from about 1 minute to about 8 hours, at a temperature from about 25° C. to about 150° C. (e.g., boiling water at 100° C. and 1 bar pressure). In certain embodiments, the pH is in the range of about 6 to about 8, the time is from about 5 minutes to about 2 hours, and the temperature is from about 75° C. to about 125° C.

In various embodiments, the method comprises exposing the water-decomposable thermoset solid material to water with a pH of about 4, about 5, about 6, about 7, about 8, about 9, or about 10. Note that a pH of "about 4" means from 3.6 to 4.4, and a pH of "about 10" means a pH from 9.6 to 10.4. In these or other embodiments, the method comprises exposing the water-decomposable thermoset solid material to water for about 1 minute, about 5 minutes, about 10 minutes, about 30 minutes, about 1 hour, about 2 hours, about 4 hours, or about 8 hours. In these or other embodiments, the method comprises exposing the water-decomposable thermoset solid material to water at a temperature of about 25° C., about 50° C., about 75° C., about 100° C., about 125° C., or about 150° C.

In these methods, the system pressure for decomposing the water-decomposable thermoset solid material is not regarded as critical and may vary. For example, in some embodiments, the system pressure is atmospheric pressure (1 bar). In various embodiments, the system pressure is about 0.01 bar, 0.1 bar, 0.5 bar, 0.9 bar, 1 bar, 1.1 bar, 1.5 bar, 2 bar, 3 bar, 4 bar, 5 bar, 10 bar, or higher. The system pressure may be adjusted by known means, such as with a vacuum pump and/or with the addition of an inert gas (e.g., $N_2$, Ar, or $CO_2$) to the system, for example.

In preferred embodiments, the method of decomposing the thermoset solid material does not require or use strongly acidic (pH<4) or strongly basic (pH>10) conditions, does not require or use high temperatures (>150° C.), and/or does not require or use any mechanical removal of water-decomposable thermoset solid material.

In various embodiments, the method comprises exposing the water-decomposable thermoset solid material to water under effective reaction conditions such that at least 50 wt %, at least 60 wt %, at least 70 wt %, at least 80 wt %, at least 90 wt %, at least 95 wt %, or at least 99 wt % decomposition (e.g., hydrolysis) of the thermoset solid material occurs. In certain methods, essentially all of the cured, water-decomposable thermoset solid material decomposes (e.g., hydrolyzes) when exposed to water under effective reaction conditions of temperature, time, and pH.

In some embodiments, at least 50 wt %, 60 wt %, 70 wt %, 80 wt %, 90 wt %, 95 wt %, or 99 wt % of the water-decomposable thermoset solid material is dissolved into the water when exposed to water under effective reaction conditions of temperature, time, and pH. The dissolution of thermoset solid material typically occurs after an amount of decomposition, which may be hydrolysis, depolymerization, degradation, or a combination thereof.

It is noted that decomposition does not necessarily lead to dissolution. For example, a large polymer molecule that is cut in half by e.g. hydrolysis may generate two oligomers that are still too large to dissolve in water. Conversely, dissolution does not necessarily require decomposition. For example, as some polymer molecules are decomposed such as by hydrolysis or depolymerization, the solution properties change and the presence of fragments of polymer within the solution may cause the new solution to be a better solvent for original polymer molecules that have not yet decomposed. These original polymer molecules are still able to be etched away by water, for purposes of some embodiments (e.g., FIGS. 1-3). These embodiments still require some amount of initial decomposition to cause this dissolution.

The water (for decomposing the polymer) may be contained in an aqueous liquid comprising water. That is, the water-decomposable thermoset solid material may be exposed to an aqueous liquid with a pH in the range of about 4 to about 10, for a time from about 1 minute to about 8 hours, at a temperature from about 50° C. to about 150° C., for example.

For example, an aqueous liquid may contain from about 1 wt % to 100 wt % water, such as about, or at least about, 5, 10, 25, 50, 75, 90, 95, or 99 wt % water. Besides water, the aqueous liquid may contain water-miscible co-solvents, such as (but not limited to) alcohols, polyols, organic acids, ketones, aldehydes, amines, or amides. The other components of the aqueous liquid may also include salts, halogens, minerals, organic impurities, inorganic impurities, pH buffers, and so on.

The water (for decomposing the polymer) may be derived from various sources, such as (but not limited to) well water, city water, rain water, ice melt, snow melt, ocean water, humidity, purified water, de-ionized (DI) water, combustion-product water, and so on. Various additives may be introduced to water, such as salts, pH buffers, disinfectants, or others. As stated above, water-miscible co-solvents (e.g. acetone) may be added to water. In a certain embodiment, the water for decomposing the polymer is recycled water derived from the solvent that is employed during synthesis of the water-decomposable thermoset solid material, when an aqueous solvent is used.

The curable resin formulations disclosed herein may be 3D-printed using many different methods. Typically, a curable resin formulation is conveyed (printed) to a region of interest, such as via stereolithography, vat polymerization, binder jetting, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place.

In stereolithography, layers of resin are cured from the top or bottom using UV-laser rastering, projection micro-stereolithography, digital light projection, or liquid crystal device projection, for example.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of liquid, curable resin formulation is jetted on selected locations and cured such as via UV light or thermally. An optional solid filler may initially be spread out on a substrate or on a region of polymer based on the selected monomer, if desired. After an initial step of binder jetting, another layer is generated via resin jetting and curing. This process may be repeated many times for large parts.

In polyjetting, a mixture of liquid, curable resin formulation (and optionally solid fillers) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one composition to be utilized simultaneously. This results in tailored mechanical properties for the final ceramic structure (following pyrolysis).

In extrusion printing, the curable resin formulation is squeezed through a micro-nozzle, or multiple micro-nozzles, and cured via UV light. One advantage is that high-aspect-ratio fillers (optional) can be aligned with the extrusion process. Alignment generally improves mechanical properties in the aligned direction.

A portion, or all, of the 3D-printed part may consist essentially of the water-decomposable thermoset solid material. The 3D-printed part may also have materials or regions that do not contain the water-decomposable thermoset solid material, i.e. the polymer material derived from first and second molecules disclosed above.

After a part is 3D printed using any of the above methods, or another method, the part may be post-cured. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

In some embodiments, a self-propagating photopolymer waveguide polymerization process is used to fabricate the water-decomposable thermoset solid material, as disclosed in commonly owned U.S. Pat. No. 7,382,959, which is hereby incorporated by reference herein.

In some embodiments, but without limiting the present invention in any way, a polymer part that remains after removal of the water-decomposable thermoset solid material is converted to a ceramic structure. The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week). Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Treatment temperature may vary from about 300° C. to about 2000° C., for example. See commonly owned U.S. patent application Ser. No. 15/822,199, which is hereby incorporated by reference herein, regarding various exemplary conditions for generating a ceramic structure.

EXAMPLES

Example 1: Formulation Preparation

In a vial, 2.2 g of tris(vinyldimethylsiloxy)boron is combined with 2.8 g of trimethylolpropane tris(3-mercaptopropionate). To the vial, acetone is added to improve miscibility of the components. A photoinitiator, bis(2,4,6-trimethylbenzoyl)-phenylphosphineoxide, is added to the resin formulation at 0.2 wt % with respect to the resin formulation weight (minus the solvent).

Example 2: Formulation Preparation

In a vial, 2.2 g of tris(vinyldimethylsiloxy)boron is combined with 2.6 g of pentaerythritol tetrakis(3-mercaptopropionate). To the vial, acetone is added to improve miscibility of the components. A photoinitiator, bis(2,4,6-trimethylbenzoyl)-phenylphosphineoxide, is added to the resin formulation at 0.2 wt % with respect to the resin formulation weight (minus the solvent).

Example 3: Radical-Cured Sacrificial Layer

The resin formulation containing a photoinitiator, provided in Example 1 or 2, is exposed to UV light with a wavelength range of 350 nm to 400 nm for 10 minutes to produce a solid sacrificial layer. The result is a cured polymer material containing a plurality of —B—O—Si— bonds that are susceptible to hydrolysis.

Example 4: Hydrolysis of Cured Sacrificial Layer

The sacrificial layer cured in Example 3 is added to boiling water (100° C., 1 atm) at initial, room-temperature, pH of about 7. After 5 minutes in the boiling water, the sacrificial layer is heavily swollen and loses structural integrity. By 60 minutes, the sacrificial layer structure is fully dissolved in water.

Applications of the present invention include, but are not limited to, additively manufactured components to reduce part count, scrap, and non-recurring engineering. Specific applications include, for example, propulsion structures (e.g., vanes, impellors, nacelles, and thrusters), control surfaces (e.g., fins and leading edges), hypersonic structures (e.g., thermal protection systems and heat shields), high-wear components (e.g., brakes, clutches, and rotors), catalyst support structures, filters, flow separators, pump components, casting molds, implantable dental and medical devices, and semiconductor processing structures.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A curable resin formulation for a water-decomposable thermoset material, said curable resin formulation comprising:
   (a) one or more first molecules containing (i) at least one boron-oxygen-silicon group and (ii) at least one first functional group that is reactive for free-radical polymerization, cationic polymerization, and/or hydrosilylation polymerization;
(b) one or more second molecules containing at least one second functional group that is reactive with said first molecules, wherein said second molecules are selected for a solubility in water of at least 50 wt %, measured at a temperature of 25° C. and a pH of 7; and
(c) an initiator for free-radical polymerization, cationic polymerization, and/or hydrosilylation polymerization.

2. A curable resin formulation for a water-decomposable thermoset material, said curable resin formulation comprising:
(a) one or more first molecules containing (i) at least one polyester group and (ii) at least one first functional group that is reactive for free-radical polymerization, cationic polymerization, and/or hydrosilylation polymerization;
(b) one or more second molecules containing at least one second functional group that is reactive with said first molecules, wherein said second molecules are selected for a solubility in water of at least 50 wt %, measured at a temperature of 25° C. and a pH of 7; and
(c) an initiator for free-radical polymerization, cationic polymerization, and/or hydrosilylation polymerization.

3. The curable resin formulation of claim 1, wherein said curable resin formulation contains boron, oxygen, and silicon in a combined concentration from about 1 wt % to about 99.9 wt % on the basis of all components contained in said curable resin formulation.

4. The curable resin formulation of claim 3, wherein said curable resin formulation contains boron, oxygen, and silicon in a combined concentration from about 10 wt % to about 90 wt % on the basis of all components contained in said curable resin formulation.

5. The curable resin formulation of claim 2, wherein said curable resin formulation contains, within said one or more first molecules, a polyester backbone from about 25 wt % to about 99 wt % of said curable resin formulation.

6. The curable resin formulation of either one of claim 1 or 2, wherein said first functional group is selected from the group consisting of vinyl, vinyl ether, allyl, alkyne, cyanate, acrylate, methacrylate, thiol, amine, epoxy, cycloaliphatic epoxy, alcohol, oxetane, hydrosilane, and combinations thereof.

7. The curable resin formulation of claim 1, wherein said first molecules are selected from the group consisting of tris(vinyldimethylsiloxy)boron, dichlorodimethylsilane, reaction products of boric acid and silanes, reaction products of boric acid and silanols, and combinations thereof.

8. The curable resin formulation of claim 2, wherein said first molecules are selected from the group consisting of glycolide diacrylate, glycolide dimethacrylate, lactide diacrylate, lactide dimethacrylate, and combinations thereof.

9. The curable resin formulation of either one of claim 1 or 2, wherein said second molecules are further selected from the group consisting of saturated or unsaturated hydrocarbons, aromatic hydrocarbons, siloxanes, alkylsiloxanes, esters, ethers, urethanes, carbonates, amines, amides, and combinations, polymers, or copolymers thereof.

10. The curable resin formulation of claim 1, wherein said second molecules are further selected from the group consisting of trimethylolpropane tris(3-mercaptopropionate), pentaerythritol tetrakis(3-mercaptopropionate), polyethylene glycol dimethacrylate, polyethylene glycol diacrylate, trivinylcyclohexane, triethylene glycol ethyl ether methacrylate, methoxypolyethylene glycol monoacrylate, polypropylene glycol dimethacrylate, tricyclodecane dimethanol diacrylate, vinyl-terminated poly(dimethylsiloxane), hydride-terminated polydimethylsiloxane, polymethylhydrosiloxanes, polymethylvinylsiloxanes, epoxy-functional silicones, methacrylate-functional silicones, acrylate-functional silicones, mercapto-functional silicones, and combinations, polymers, or copolymers thereof.

11. The curable resin formulation of either one of claim 1 or 2, wherein said second functional group is selected from the group consisting of vinyl, allyl, thiol, mercaptan, acrylate, methacrylate, alkene, alkyne, epoxy, hydrosilane, and combinations thereof.

12. The curable resin formulation of either one of claim 1 or 2, wherein said initiator is selected from the group consisting of a photoinitiator, a thermal free-radical initiator, a cationic initiator, a hydrosilylation catalyst, and combinations thereof.

13. The curable resin formulation of either one of claim 1 or 2, wherein said initiator is selected from the group consisting of azobisisobutyronitrile, 1,1'-azobis(cyclohexanecarbonitrile), benzoyl peroxide, di-tert-butyl peroxide, methyl ethyl ketone peroxide, 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, sulfonium-iodonium-ferrocenium salts, cyclopentadienylcumene-iron hexafluorophosphate, diphenyliodonium phosphate, triarylsulfonium hexafluoroantimonate, platinum-carbonyl-cyclovinylmethylsiloxane complex, platinum-divinyltetramethyldisiloxane complex, platinum(II) acetylacetonate, and combinations thereof.

14. The curable resin formulation of claim 2, wherein said second molecules are further selected from the group consisting of trimethylolpropane tris(3-mercaptopropionate), pentaerythritol tetrakis(3-mercaptopropionate), polyethylene glycol dimethacrylate, polyethylene glycol diacrylate, trivinylcyclohexane, triethylene glycol ethyl ether methacrylate, methoxypolyethylene glycol monoacrylate, polypropylene glycol dimethacrylate, tricyclodecane dimethanol diacrylate, vinyl-terminated poly(dimethylsiloxane), hydride-terminated polydimethylsiloxane, polymethylhydrosiloxanes, polymethylvinylsiloxanes, epoxy-functional silicones, methacrylate-functional silicones, acrylate-functional silicones, mercapto-functional silicones, and combinations, polymers, or copolymers thereof.

* * * * *